United States Patent [19]
Martin et al.

[11] Patent Number: 4,970,711
[45] Date of Patent: Nov. 13, 1990

[54] BULK ERASER FOR OPTICAL MEMORY MEDIA

[75] Inventors: Michael B. Martin; Robert F. Ray, both of San Jose; Bryan K. Clark, Sunnyvale, all of Calif.

[73] Assignee: Tandy Corporation, Forth Worth, Tex.

[21] Appl. No.: 152,696

[22] Filed: Feb. 5, 1988

[51] Int. Cl.⁵ .............................................. G11B 7/00
[52] U.S. Cl. ................................ 369/100; 430/19.00; 369/275.200
[58] Field of Search ................ 360/66, 118; 369/100, 369/109, 13, 275, 275.2, 275.4; 365/113, 144, 218; 346/76 L, 135.1; 430/19

[56] References Cited

U.S. PATENT DOCUMENTS

| | | | |
|---|---|---|---|
| 2,766,328 | 10/1956 | Handschin et al. | 360/66 |
| 3,761,942 | 9/1973 | Lorenz et al. | 430/19 X |
| 3,925,767 | 12/1975 | Witteles et al. | 365/114 X |
| 4,264,986 | 4/1981 | Willis | 369/109 X |
| 4,371,954 | 2/1983 | Cornet | 369/275 X |
| 4,462,055 | 7/1984 | Jackson et al. | 360/66 X |
| 4,478,782 | 10/1984 | Kuder et al. | 369/275 X |
| 4,513,071 | 4/1985 | Mey | 430/19 X |
| 4,630,249 | 12/1986 | Broat et al. | 369/13 |
| 4,635,245 | 1/1987 | Smith | 369/275 |
| 4,686,661 | 8/1987 | Isaka | 360/66 X |
| 4,717,975 | 1/1988 | Ogura et al. | 360/66 |
| 4,719,615 | 1/1988 | Feyrer et al. | 369/284 |
| 4,748,592 | 5/1988 | Nagao et al. | 365/113 |
| 4,771,347 | 9/1988 | Horimai et al. | 369/284 X |
| 4,780,867 | 10/1988 | Lind et al. | 369/284 X |
| 4,794,068 | 12/1988 | Miyazaki et al. | 430/19 X |
| 4,825,430 | 4/1989 | Halter et al. | 369/100 X |

FOREIGN PATENT DOCUMENTS 2110406  6/1983  United Kingdom ................ 369/275

OTHER PUBLICATIONS

"Injection Laser Writing on Chalcogenide Films"; Smith, Applied Optics, Apr 1974, vol. 13, No. 4, pp. 795-798.
"Erasable Magneto-Optic Recording"; Hartmann et al, Philips Technical Review, vol. 42, No. 2, Aug. 1985, pp. 37-47.
"Erasable Optical Discs", Metzger et al, Popular Science, May 1987, pp. 56-59, 101, 102.
"Bulk Eraser", Faircloth et al; IBM Tech. Bul.; vol. 17, No. 5, Oct. 1974, p. 1262.

*Primary Examiner*—Aristotelis M. Psitos
*Attorney, Agent, or Firm*—Townsend & Townsend

[57] ABSTRACT

The entire data content of a thermally erasable optical memory medium is erased simultaneously by irradiating the entire signal-retaining layer of the medium with light in such a manner that the signal-retaining layer is preferentially heated over other layers in the medium, particularly other thermo-optically active layers if any are present. The irradiation is most effectively achieved with a flash of light at high intensity and short duration.

3 Claims, 2 Drawing Sheets

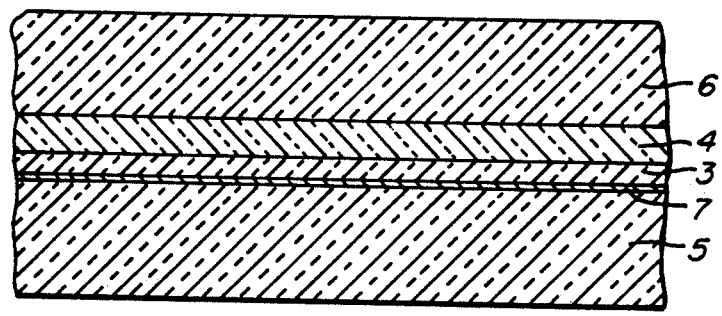
FIG._1.

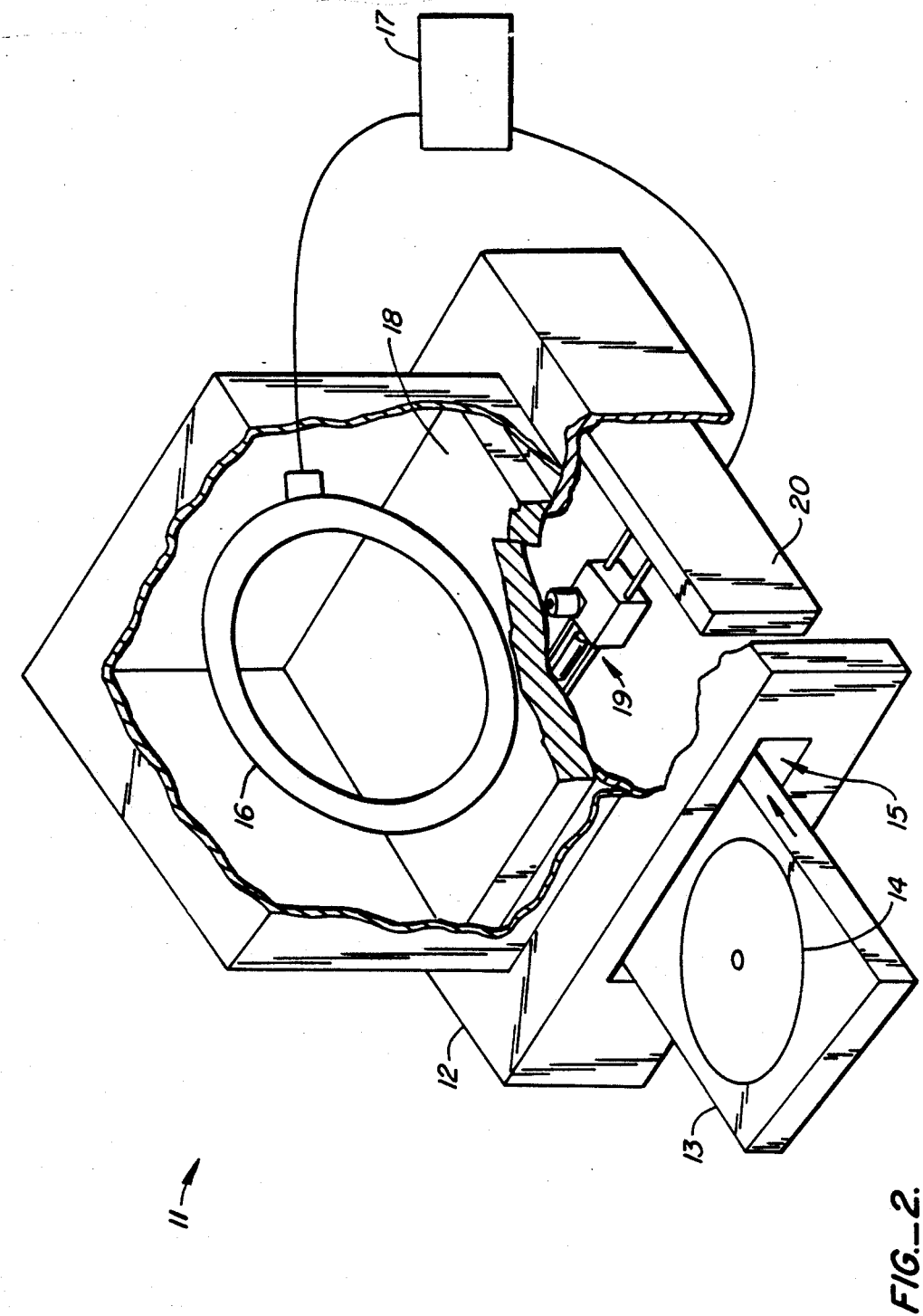
FIG._2.

BULK ERASER FOR OPTICAL MEMORY MEDIA

This invention relates to erasable optical data storage media, and particularly to means for erasing data stored on such media.

BACKGROUND OF THE INVENTION

Among the various types of optical data storage media are a group of media which can be both recorded on and erased. The signals which such media can produce vary among three general types: reflective, transmissive and absorptive. These signals may be produced in a variety of ways, including the use of multilayer dye-polymer materials, where the signals appear as pits (or bumps) or holes; phase-change materials where the signal is represented by a localized amorphous region in an otherwise crystalline layer or vice-versa, the transition being induced by heat; and magneto-optical materials, where the signals are localized regions which bear a magnetization in a direction different from that of the surrounding regions.

In each of these materials, formation of the signals (i.e., recordation of the data) includes the localized application of heat, accomplished by the absorption of light from a laser focused on the data track. Erasure is also achieved by the application of heat, either to be absorbed by the same layer which absorbed the heat during recordation, or by another layer in the medium, depending on the technology of the medium. In two-layer dye-polymer media, for example, a retention layer when at ambient temperature rigidly retains the surface protrusions induced by a neighboring expansion layer during recordation, but when selectively heated above its glass transition temperature during the erase process, permits the expansion layer to resume its uniform unexpanded state, thereby removing the data. In magneto-optical media, erasure is effected by heating the data-bearing layer in the presence of a magnetic field which again changes the direction of magnetization in the data regions to return the entire layer to a uniform magnetization direction. Finally, in phase-change media, erasure is effected by heating the data-bearing layer to a temperature just below its melting point, then cooling it to regain its original crystalline state.

Heretofore, such erasure has been achieved with the use of a laser focused on the data track, with the data bits passing over the point of focus in succession. Information is thus erased at the same speed as it is recorded or played back. The process is timeconsuming and tedious, and requires tracking and focusing considerations similar to those encountered during recordation and reading.

SUMMARY OF THE INVENTION

It has now been discovered that erasable optical memory media containing thermo-optically active layers may be erased in bulk, removing all data on a single disk or other type of memory bank at once, without the need for focusing, tracking, or prolonged time. In accordance with this invention, the medium is irradiated with light of a wavelength such that absorption by the medium occurs, yet in a manner in which the signal-retaining layer is heated preferentially over other thermo-optically active layers present in the medium.

The term "signal-retaining layer" is used herein to denote the thermo-optically active layer which serves to fix the data marks in the medium, and which is heated during erasure and response to such heating by causing or permitting the data marks to become indistinguishable from the surrounding regions (and thereby disappearing). Depending on the technology of the medium, the signal-retaining layer may be the same thermo-optically active layer which responds directly to the record laser during recordation to form a mark (as in phase-change and magneto-optical media), or it may be separate from the latter, yet functioning in conjunction with it to hold the mark thus formed (such as in dye-polymer media).

In its various embodiments, the invention extends both to systems where the signal-retaining layer is heated directly by the irradiation due to its own absorptivity of the irradiating light, as well as to system where it is heated indirectly by conduction from another layer in the system which is heated directly. The choice between the two methods will vary with preference, as well as the nature of the signal-retaining layer and the configuration of the entire medium. Selectivity of the signal-retaining layer over the others may be achieved in part by using high intensity irradiation of short duration, minimizing the transfer of heat to layers where it is not desired.

Further embodiments, features and advantages of the invention will be apparent from the description which follows.

BRIEF DESCRIPTION OF THE DRAWINGS

FIG. 1 is a cross-sectional view of an example of an erasable optical memory medium to which the invention is applicable.

FIG. 2 is a perspective view in partial cutaway of apparatus which performs by erasure on an optical memory disk in accordance with the present invention, as well as recordation on such disk.

DETAILED DESCRIPTION OF THE INVENTION AND PREFERRED EMBODIMENTS

The intensity and duration of the irradiation will be selected in accordance with the characteristics of the medium, including the signal technology embodied in the medium, the configuration of the layers of the medium, and the materials used to form the layers. A high intensity permits the desired results to be achieved with a beam of short duration, the short duration being desirable in most cases where conduction of heat to certain regions of the medium is undesired. As stated above, the region sought to be heated is the signal-retaining layer, whereas regions where heating is not desired would be other thermo-optically active layers and layers which are constructed of a material not capable of withstanding the high temperature reached by the signal-retaining layer.

In general, the signal-retaining layer will be less than fully absorptive of light from the erase irradiation, and also of a low or moderate thermal conductivity. In cases where the signal-retaining layer is heated directly by absorption of light from the irradiation, the short duration of the irradiation will minimize the conduction of heat from the signal-retaining layer to adjacent layers. In cases, however, where the signal-retaining layer is heated by conduction rather than light absorption, the irradiated layer will be one in which a high degree of absorption takes place (preferably a blackbody approaching full absorption), and conduction occurs through layers which are highly thermally conductive, such as metallic reflection layers.

With these considerations in mind, the intensity and duration of the irradiation may vary. In most cases, a light intensity such as that produced by a common xenon flash or stroboscopic light tube will provide the desired results. Likewise, a duration of about 10 milliseconds or less, preferably about 1 millisecond or less, and most preferably from about 0.1 millisecond to about 1 millisecond, will produce the best results.

The wavelength range of the irradiation light may be broad or narrow, again depending on the technology embodied in the medium as well as the configuration of layers forming the medium. In two-layer dye-polymer media, for instance, a limited wavelength range which will result in selective illumination of the retention layer is preferred since the most efficient erasure is achieved by heating the retention layer 3 (as designated in FIG. 1) more than the expansion layer 4. In most such media, this is achieved by avoidance of visible light in the irradiation spectrum. This may be achieved by the use of a filter, the selection of which is well within the routine knowledge of those skilled in the optics arts. Such a filter is particularly useful with systems where the light source is a xenon tube, since the light spectrum emitted by such a tube approximates the blackbody radiation defined by color temperatures in the range of 5500°–6500° K., which includes the visible spectrum. In many commercially available optical memory systems, erasure is typically achieved with light from a laser at a wavelength of 840 nm. In such cases, the optimum filter will be one which absorbs substantially all visible light yet transmits virtually all light at that wavelength.

Indirect heating of the signal-retaining layer by conduction from other layers in the media may be achieved in a variety of ways. As one example, a protective layer 5, which is generally present in multi-layer dye-polymer media, may be irradiated directly. To maximize the heating thus achieved, the protective layer may be designed to, or constructed of a material which will, absorb energy over the entire emission spectrum of the flash tube, and to absorb all light radiated into it, thereby approximating a blackbody in light absorption characteristics. Since the protective layer is generally on the opposite side of the medium as the substrate 6 (through which reading and recordation lasers are directed), efficient erasure will be achieved by arranging the erasing light source and the medium in such a manner that the light emitted by the light source strikes the protective layer side of the medium rather than the substrate side.

The protective layer in such media is generally constructed of a material having a high thermoconductivity, to dissipate heat generated in the expansion and retention layers during recordation. In media where a reflective coating 7 is also included, particularly between the protective layer and the retention layer, the reflective layer is also highly thermally conductive. The result is a high rate of heat transmission from the protective layer (which has absorbed light from the erase irradiation) through the reflective coating (if one is present) to the retention layer, thereby evenly and efficiently heating the retention layer to the extent needed to obliterate the data. The relatively low thermoconductivity of the retention layer and the expansion layer at its opposite side, however, prevents or minimizes further heat transfer from taking place. The remaining thermooptically active layers thereby remaining relatively unaffected.

The irradiation will be carried out in accordance with methods adapted specifically for the particular technology embodied in the medium. For magneto-optical media, for example, the irradiation will be performed in the presence of a magnetic field, permitting uniform magnetization in the signal-bearing layer. Adaptations for other types of systems will be readily apparent to those skilled in the art.

Turning now to FIG. 2, an apparatus 11 is shown which combines various elements for recordation of data on an optical memory disk as well as bulk erasure of the disk in accordance with the present invention. The apparatus contains a housing 12 with a support 13 for an optical memory disk 14, the support 13 being movable in and out of the housing 12 through a slot 15.

Inside the housing is a xenon flash tube 16 operated by a controller 17 to produce a flash of the desired intensity and duration. Placed between the flash tube 16 and the support surface 13 is an optical filter 18 which screens out visible light or any portion of the spectrum emitted by the flash tube 16 which interferes with or is not needed for the bulk erasing function. Also part of the apparatus is a recording element 19 and magnetic poles 20, the latter as needed for magnetooptical media. In the system shown, actuation of the magnetic poles 20 is controlled by the controller 17 as well.

The parameters of the system are not critical, nor are the specific types of elements or materials used: these may vary widely. One system which has been found to be effective, however, involves the use of a xenon flash tube of the following characteristics:

Power output: 4400 Beam-candlepower-seconds
Aperture: 53×26 mm (rectangel)
Flash Duration: 3 milliseconds
Intensity at medium: 0.25 millijoules per square mm in active layer
Color temperature of bulb: 5600° K.

The foregoing is offered primarily for purposes of illustration. It will be readily apparent to those skilled in the art that numerous variations and modifications of the materials, configurations, system parameters and procedures described above may be made without departing from the spirit and scope of the invention.

What is claimed is:

1. A method for erasing an erasable dye-polymer optical memory medium containing two thermo-optically active layers, one of which is a signal-producing layer susceptible to localized expansion upon heating, and the other of which is a signal-retaining layer which fixes such localized expansion in said signal-producing layer until heated, said method comprising irradiating said medium with light from a xenon flash lamp, said light being susceptible to absorption by said medium to cause heating of the entirety of said signal-retaining layer substantially simultaneously and preferentially over said signal-producing layer.

2. Apparatus for erasing an erasable optical memory medium containing at least one thermo-optically active layer one of which is a signal-retaining layer, said apparatus comprising:

(a) a housing sized to receive said medium;
(b) a source in said housing of light susceptible to absorption by said medium to an extent sufficient to cause heating of the entirety of said signal-retaining layer substantially simultaneously and preferentially over any other thermooptically active layer therein;
(c) a support in said housing for said medium; and
(d) a filter arranged between said source of light and said support, said filter selected to filter out light in a selected wavelength range.

3. Apparatus in accordance with claim 2 in which said selected wavelength range is the visible range.

* * * * *